US011293754B2

(12) United States Patent
Hirano et al.

(10) Patent No.: US 11,293,754 B2
(45) Date of Patent: Apr. 5, 2022

(54) SURVEYING INSTRUMENT

(71) Applicant: TOPCON Corporation, Tokyo-to (JP)

(72) Inventors: Satoshi Hirano, Tokyo-to (JP); Kaoru Kumagai, Tokyo-to (JP); Fumio Ohtomo, Saitama (JP); Kazuki Osaragi, Tokyo-to (JP); Nobuyuki Nishita, Tokyo-to (JP); Tetsuji Anai, Tokyo-to (JP); Noriyasu Kiryuu, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 117 days.

(21) Appl. No.: 16/824,788

(22) Filed: Mar. 20, 2020

(65) Prior Publication Data
US 2020/0318966 A1    Oct. 8, 2020

(30) Foreign Application Priority Data

Apr. 2, 2019   (JP) .............................. JP2019-070736

(51) Int. Cl.
*G01C 15/00*    (2006.01)
(52) U.S. Cl.
CPC .................................. *G01C 15/008* (2013.01)
(58) Field of Classification Search
USPC ..................................................... 33/291, 290
See application file for complete search history.

(56) References Cited

U.S. PATENT DOCUMENTS 765,871 A * 7/1904 Akins .................. G01C 15/004
33/290
2,096,638 A * 10/1937 Higgins, Jr. ........... G01C 15/10
33/290
(Continued)

FOREIGN PATENT DOCUMENTS

CN          109579809 A  *  4/2019
DE      102010033561 B3 * 12/2011   ........... G01C 22/025
(Continued)

OTHER PUBLICATIONS

European communication dated Sep. 1, 2020 in corresponding European patent application No. 20165856.4.
(Continued)

*Primary Examiner* — Christopher W Fulton
(74) *Attorney, Agent, or Firm* — Nields, Lemack & Frame, LLC

(57) ABSTRACT

There is provided a surveying instrument including a monopod which is installed on a reference point, a surveying instrument main body which is provided at a known distance from a lower end of the monopod and a known angle with respect to an axis of the monopod, two auxiliary legs which extend downward from a middle portion of the monopod at a predetermined angle, and a lower image pickup module which is provided at a known position with respect to the surveying instrument main body, wherein the surveying instrument main body comprises a measuring unit, a measuring direction image pickup module, and an arithmetic control module, wherein the surveying instrument main body is supported by three points by the monopod and the auxiliary legs, and a positional change or a rotational change of the surveying instrument main body is calculated based on a change of the lower image.

6 Claims, 9 Drawing Sheets

(56) References Cited

U.S. PATENT DOCUMENTS

| | | | | |
|---|---|---|---|---|
| 3,863,945 | A | 2/1975 | Dunstan | |
| 6,044,567 | A | 4/2000 | Feist | |
| 6,411,372 | B1 | 6/2002 | Donath et al. | |
| 6,834,839 | B1 * | 12/2004 | Wilson | F16M 13/02 |
| | | | | 248/230.1 |
| 9,958,268 | B2 * | 5/2018 | Ohtomo | G01S 17/66 |
| 10,281,580 | B2 * | 5/2019 | Ohtomo | G01C 15/002 |
| 10,767,991 | B2 * | 9/2020 | Ohtomo | G01S 17/42 |
| 2005/0022400 | A1 * | 2/2005 | Ritenour | G01C 15/002 |
| | | | | 33/292 |
| 2015/0219455 | A1 * | 8/2015 | Jordil | G01C 15/00 |
| | | | | 33/228 |
| 2015/0354954 | A1 * | 12/2015 | Nishita | G01C 5/00 |
| | | | | 33/292 |
| 2016/0146604 | A1 * | 5/2016 | Metzler | G01C 21/20 |
| | | | | 33/228 |
| 2016/0238385 | A1 | 8/2016 | Ohtomo et al. | |
| 2016/0238708 | A1 | 8/2016 | Ohtomo et al. | |
| 2016/0259039 | A1 | 9/2016 | Ohtomo et al. | |
| 2017/0131404 | A1 | 5/2017 | Ohtomo et al. | |
| 2017/0168142 | A1 | 6/2017 | Kumagai et al. | |
| 2017/0227357 | A1 | 8/2017 | Ohtomo et al. | |
| 2018/0052232 | A1 | 2/2018 | Ohtomo et al. | |
| 2019/0011536 | A1 | 1/2019 | Ohtomo et al. | |
| 2019/0063920 | A1 * | 2/2019 | Nishita | G01S 7/4808 |
| 2019/0063922 | A1 * | 2/2019 | Ohtomo | G01C 3/08 |
| 2019/0186912 | A1 * | 6/2019 | Ohtomo | G01C 5/00 |
| 2020/0318963 | A1 | 10/2020 | Hirano et al. | |

FOREIGN PATENT DOCUMENTS

| | | | | |
|---|---|---|---|---|
| EP | 1024344 | A1 * | 8/2000 | G01C 15/002 |
| EP | 2400263 | A2 * | 12/2011 | G01C 15/004 |
| EP | 2578992 | A1 * | 4/2013 | G01B 11/26 |
| EP | 2696167 | A1 | 2/2014 | |
| EP | 2778606 | A1 | 9/2014 | |
| JP | 2016-151422 | A | 8/2016 | |
| JP | 2016-151423 | A | 8/2016 | |
| JP | 2016-161411 | A | 9/2016 | |
| JP | 2017-90244 | A | 5/2017 | |
| JP | 2017-106813 | A | 6/2017 | |
| JP | 2017-142081 | A | 8/2017 | |
| JP | 2019-15601 | A | 1/2019 | |
| WO | WO-2005090910 | A1 * | 9/2005 | G01C 15/002 |

OTHER PUBLICATIONS

European communication dated Oct. 22, 2020 in co-pending European patent application No. 20165904.2.

* cited by examiner

ARROW VIEW ALONG LINE A-A

ARROW VIEW ALONG LINE B-B

SURVEYING INSTRUMENT

BACKGROUND OF THE INVENTION

The preset invention relates to a surveying instrument which can be easily installed.

In case of performing the surveying by using a surveying instrument, the surveying instrument must be first installed on a reference point.

Generally, in case of installing the surveying instrument on the reference point, the installation is performed using a tripod. In this case, the surveying instrument is horizontally leveled up on the tripod, and a machine center of the surveying instrument must be accurately positioned on a vertical line running through the reference point. Further, a height from the reference point to the machine center (an instrument height of the surveying instrument) must be also measured. For this reason, installation work of a surveying instrument is complicated and requires a time and a skill.

Further, in the conventional example, there is a surveying instrument in which a surveying instrument main body having a tilt sensor as incorporated is provided on a monopod and a lower end of the monopod is installed on a reference point. According to this surveying instrument, since the surveying instrument main body does not have to be horizontally leveled up, the installation is easy, and the transfer is also easy.

To measure a vertical angle with the use of a high-accurate tilt sensor, an increase in stability of the surveying instrument main body is required. However, in case of the surveying instrument using the monopod, since the surveying instrument main body is provided on the monopod, it is difficult to keep stably holding the surveying instrument main body during the measurement, and a hand cannot be released from the surveying instrument main body during the measurement. Further, when a high-capacity battery, a sophisticated arithmetic processing system, or the like is mounted in the surveying instrument main body, a weight is increased, and there also occurs a problem which is a difficulty in transfer of the surveying instrument.

SUMMARY OF INVENTION

It is an object of the present invention to provide a surveying instrument which facilitates the transfer and improves the safety during the measurement.

To attain the object as a described above, a surveying instrument according to the present invention includes a monopod which is installed on a reference point, a surveying instrument main body which is provided at a known distance from a lower end of the monopod and a known angle with respect to an axis of the monopod and has a reference optical axis, two auxiliary legs which extend downward from a middle portion of the monopod at a predetermined angle, and a lower image pickup module which is provided at a known position with respect to the surveying instrument main body, wherein the surveying instrument main body comprises a measuring unit configured to measure a distance to an object to be measured, a measuring direction image pickup module configured to acquire an observation image including the object to be measured in a predetermined relationship with the reference optical axis, and an arithmetic control module configured to make the measuring unit for measuring a predetermined measuring point, make the measuring direction image pickup module for acquiring an image of the object to be measured, and make the lower image pickup module for acquiring a lower image, wherein the surveying instrument main body is supported by three points by the monopod and the auxiliary legs, and a positional change or a rotational change of the surveying instrument main body is calculating based on a change of the lower image.

Further, in the surveying instrument according to a preferred embodiment, the monopod comprises a reference plate provided at the lower end of the monopod, a reference target provided on an upper surface of the reference plate, and a ferrule provided on a lower surface of the reference plate in such a manner that a center of the reference target coincides with an axis, wherein the lower image is acquired in such a manner that the reference target and at least one reference object are included, and the arithmetic control module calculates a rotation angle of a longitudinal direction and a rotation angle of a lateral direction of the surveying instrument main body based on a displacement of a position of at least one of the reference target and the reference object in the lower image.

Further, in the surveying instrument according to a preferred embodiment, the monopod is configured expandable or contractible.

Further, in the surveying instrument according to a preferred embodiment, a leg length reference line is set in the lower image, and the arithmetic control module calculates an expansion or contraction amount of the monopod based on a distance between the leg length reference line and a lower end of the reference plate in the lower image.

Further, in the surveying instrument according to a preferred embodiment, the surveying instrument main body further comprises an attitude detector configured to detect the tilts of two axes with respect to the horizontality, and the arithmetic control module converts a rotation angle of a longitudinal direction and a rotation angle of a lateral direction of the surveying instrument main body into a vertical angle and a horizontal angle based on a detection result of the attitude detector.

According to the present invention, the surveying instrument includes a monopod which is installed on a reference point, a surveying instrument main body which is provided at a known distance from a lower end of the monopod and a known angle with respect to an axis of the monopod and has a reference optical axis, two auxiliary legs which extend downward from a middle portion of the monopod at a predetermined angle, and a lower image pickup module which is provided at a known position with respect to the surveying instrument main body, wherein the surveying instrument main body comprises a measuring unit configured to measure a distance to an object to be measured, a measuring direction image pickup module configured to acquire an observation image including the object to be measured in a predetermined relationship with the reference optical axis, and an arithmetic control module configured to make the measuring unit for measuring a predetermined measuring point, make the measuring direction image pickup module for acquiring an image of the object to be measured, and make the lower image pickup module for acquiring a lower image, wherein the surveying instrument main body is supported by three points by the monopod and the auxiliary legs, and a positional change or a rotational change of the surveying instrument main body is calculating based on a change of the lower image. As a result, an attitude of the surveying instrument main body during the measurement can be stably maintained, and a positional change and a rotational change of the surveying instrument main body can be measured based on the lower image.

DETAILED DESCRIPTION OF THE PREFERRED EMBODIMENTS

A description will be given on an embodiment of the present invention by referring to the attached drawings.

Figure 1:
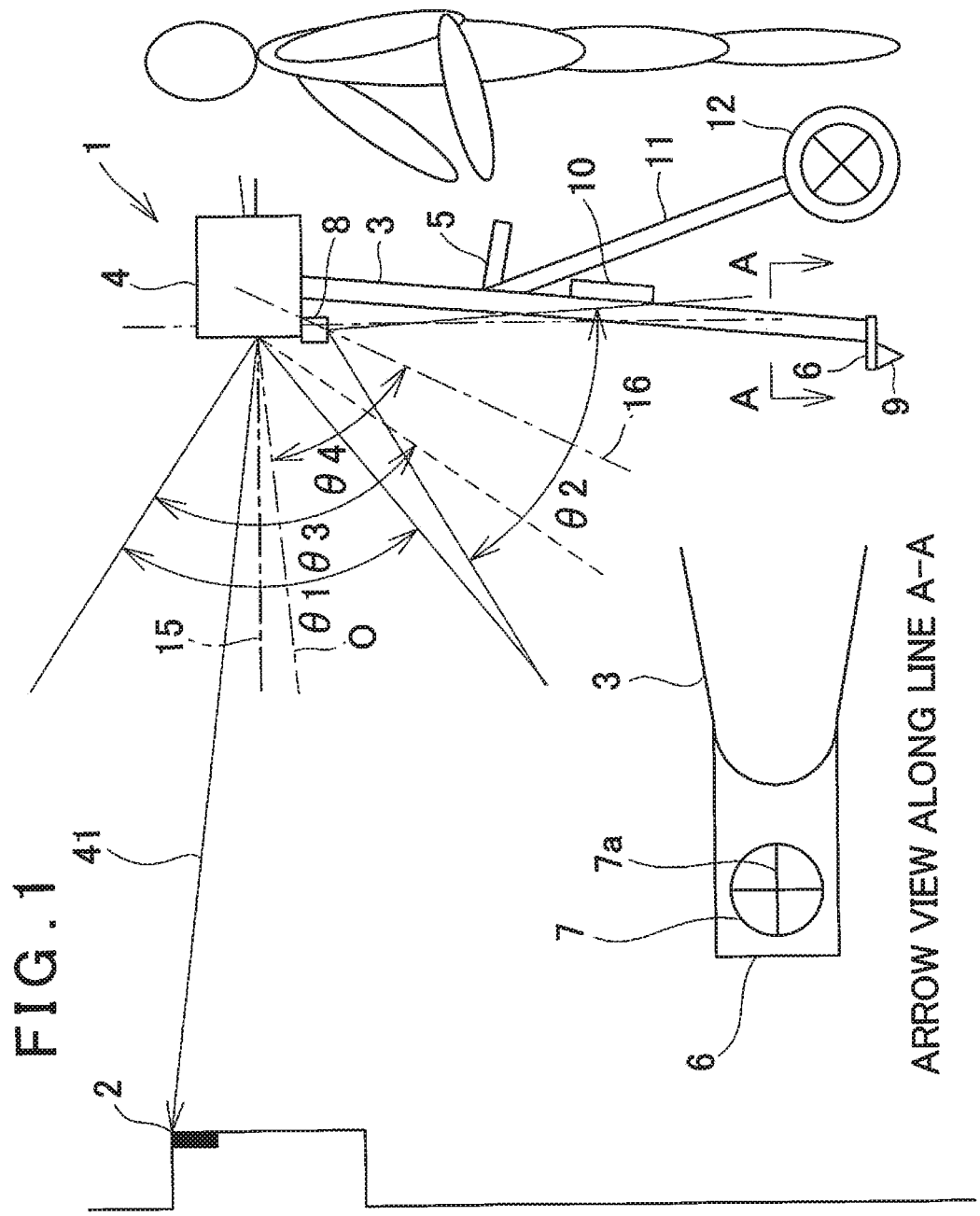
FIG. 1 is a schematical drawing showing a first embodiment of the present invention.

FIG. 1 is a drawing to show an outline of the first embodiment of the present invention, and in FIG. 1, a reference numeral 1 denotes a surveying instrument and a reference numeral 2 denotes an object to be measured.

The surveying instrument 1 has mainly a monopod (monopole) 3, a surveying instrument main body 4 provided on an upper end of the monopod 3 and an operation panel 5, and the operation panel 5 is provided at an appropriate position of the monopod 3, at a position where a measurement worker can perform an operation easily in a standing attitude, for instance.

The operation panel 5 may be provided in a fixed manner with respect to the monopod 3 or may be attachable and detachable. It may be so configured that the operation panel 5 is capable of operating in a state where the operation panel 5 is mounted on the monopod 3. Further, it may be so configured that the operation panel 5 is separated from the monopod 3, and in a state of a single body, the operation panel 5 can be operated.

Further, a processing controller 10 is provided on a middle portion of the monopod 3. In the processing controller 10, for instance, a high-accurate arithmetic processing module or a high-capacity battery is accommodated. The operation panel 5, the surveying instrument main body 4, and the processing controller 10 are capable of data communication via various types of communication means such as a wired and a wireless. It is to be noted that, when the high-accurate arithmetic processing module, the high-capacity battery, and the like are not required, the processing controller 10 may be omitted.

A reference plate 6 which is square-shaped and tabular is provided at a lower end of the monopod 3, and a reference target 7 having a cross, for instance, is provided on an upper surface of the reference plate 6. A position at which the reference target 7 is provided is a position which can be photographed by a later-described lower image pickup module 8, and it is appropriately determined with respect to a field angle of the lower image pickup module 8 or a size of the reference plate 6. Further, one (a reference line 7a) of the cross of the reference target 7 is parallel to a reference optical axis "O" of the surveying instrument main body 4, and a tip side of the reference line 7a is a sighting direction of the surveying instrument main body 4 (a direction of the reference optical axis "O").

A ferrule 9 is provided on a lower surface of the reference plate 6. The ferrule 9 has a tapered shape, and a lower end of the ferrule 9 has a sharp tip. Further, an axis of the ferrule 9 coincides with an intersection of the cross of the reference target 7. It is to be noted that a distance between the lower end of the ferrule 9 and the reference target 7 is known, and a positional relationship between the lower end of the ferrule 9 and an upper end of the monopod 3 (the distances in the horizontal direction and the vertical direction) is known. Further, a positional relationship between the lower end of the ferrule 9 and the machine center (a point which becomes a reference for the measurement) of the surveying instrument main body 4 (the distances in the horizontal direction and the vertical direction) is also known. It is to be noted that the monopod 3, the reference plate 6, and the ferrule 9 may be generically called a monopod.

Further, two auxiliary legs 11 are mounted to the monopod 3, and the auxiliary legs 11 are foldably coupled with the monopod 3. In a state where the auxiliary legs 11 are folded, the auxiliary legs 11 adhere closely or substantially adhere closely to the monopod 3, and a lock mechanism, which holds the close contact state, is provided. Alternatively, in a simplified manner, a band (not shown) bundling the monopod 3 and the auxiliary legs 11 may be provided.

Each of the two auxiliary legs 11 can rotate around an upper end in an approaching or separating direction with respect to the monopod 3 at a predetermined angle, and can be fixed at a rotated position. A wheel 12 is rotatably provided at the lower end of each of the auxiliary legs 11. The surveying instrument 1 can stand by itself with the use of the monopod 3 and the two auxiliary legs 11 (the two wheels 12). It is to be noted that the surveying instrument main body 4 may be mounted to the monopod 3 in such a manner that the axis of the monopod 3 becomes orthogonal with respect to the reference optical axis "O", or it may be mounted to the monopod 3 in such a manner that the reference optical axis "O" becomes horizontal when the surveying instrument 1 is arranged to stand by itself. Further, an opening meter as the opening detecting means may be provided to the two auxiliary legs 11 so that an opening angle between the auxiliary legs 11 and an opening angle between the monopod 3 and the auxiliary legs 11 can be detected. Further, an axle of each of the wheels 12 is configured to become orthogonal with respect to the reference optical axis "O".

The surveying instrument main body 4 has a distance measuring unit 13 as an electronic distance meter (to be described later) and a measuring direction image pickup module 14 (to be described later). Further a lower image pickup module 8, which picks up downward, is provided on the surveying instrument main body 4. A reference optical axis of an optical system of the distance measuring unit 13 is the reference optical axis "O". An optical axis of the measuring direction image pickup module 14 (hereinafter a first image pickup optical axis 15) is tilted upward by a predetermined angle (6°, for instance) with respect to the reference optical axis "O", and a distance and a positional relationship between the optical axis of the measuring direction image pickup module 14 and an optical axis of the distance measuring unit 13 are already-known. The distance measuring unit 13 and the measuring direction image pickup module 14 are accommodated in a casing of the surveying instrument main body 4.

As the lower image pickup module 8 has an image pickup element such as a CCD or a CMOS, and an image pickup device capable of acquiring a digital image such as a still image, a continuous image, or a video image in real time. Further, based on an image signal output from the image pickup element and the coordinate information associated with the pixel, a position of each pixel in the image pickup element can be detected with reference to an optical axis of the lower image pickup module 8 (hereinafter a second image pickup optical axis 16). As the lower image pickup module 8, a commercial digital camera can be used, for instance.

The lower image pickup module 8 is fixed to the casing of the surveying instrument main body 4, and the lower image pickup module 8 (that is, an image forming position of the lower image pickup module 8) is provided at a known position (distance) with respect to the machine center of the surveying instrument main body 4. The second image pickup optical axis 16 is directed downward and set at the predetermined known angle (θ4) with respect to the reference optical axis "O", and the second image pickup optical axis 16 and the reference optical axis "O" have a known relationship (distance). It is to be noted that the lower image pickup module 8 may be accommodated in the casing and may be integrated with the surveying instrument main body 4.

A field angle of the measuring direction image pickup module 14 is "θ1", the field angle of the lower image pickup module 8 is "θ2", and "θ1" and "θ2" may be equal or may be different. Further, the field angle of the measuring direction image pickup module 14 and the field angle of the lower image pickup module 8 do not have to overlap each other, but they preferably overlap each other by a predetermined amount. Further, the field angle of the lower image pickup module 8 and the direction of the second image pickup optical axis 16 are set so that the reference target 7 is included in an image. It is to be noted that a reference character "θ3" denotes a scan range of the surveying instrument main body 4.

Figure 2:
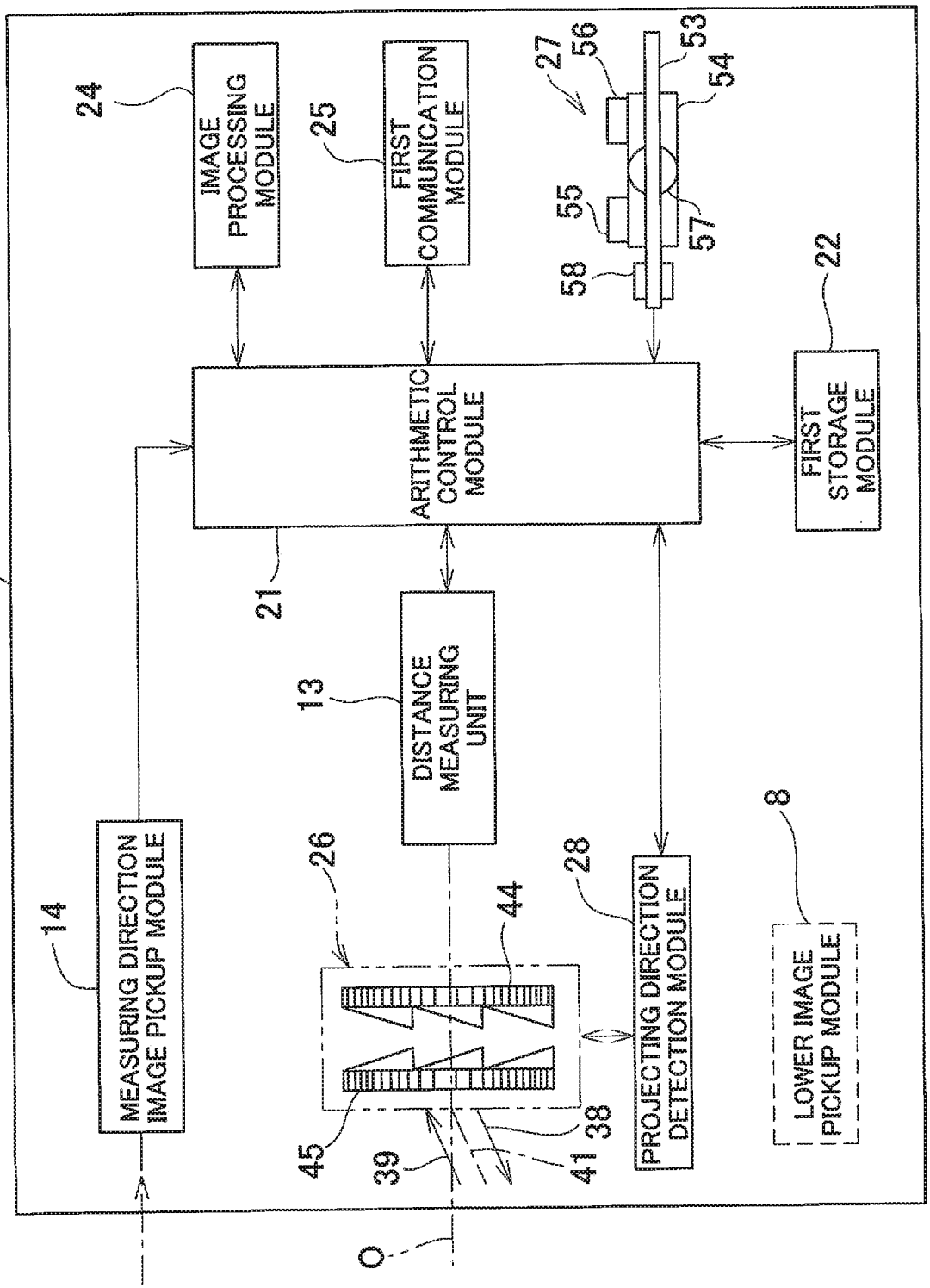
FIG. 2 is a schematical block diagram showing a surveying instrument main body according to the first embodiment of the present invention.

A description will be given on an outline configuration of the surveying instrument main body 4 by referring to FIG. 2.

The surveying instrument main body 4 includes the distance measuring unit 13, an arithmetic control module 21, a first storage module 22, an image processing module 24, a first communication module 25, an optical axis deflector 26, an attitude detector 27, the measuring direction image pickup module 14 and a projecting direction detecting module 28, and they are accommodated in a casing 31 and integrated.

The distance measuring unit 13 and the optical axis deflector 26 are disposed on the reference optical axis "O". The distance measuring unit 13 has a distance measuring optical axis 41 running through a center of the optical axis deflector 26. The measuring unit 13 emits the distance measuring light 38 as a laser beam onto the distance measuring optical axis 41, receives the reflected distance measuring light 39 which enters from the distance measuring optical axis 41, and measures the object to be measured 2 based on a round-trip time and a time velocity of the reflected distance measuring light 39. It is to be noted that the distance measuring unit 13 functions as an electronic distance meter. Further, the distance measurement data acquired by the distance measuring unit 13 is stored in the first storage module 22.

The optical axis deflector 26 deflects the distance measuring optical axis 41, and sights the distance measuring light 38 on the object to be measured 2. In a state where the optical axis deflector 26 does not deflect the distance measuring optical axis 41, the distance measuring optical axis 41 coincides with the reference optical axis "O".

As the laser beam, any one of the continuous light, the pulsed light or the intermittent modulated distance measuring light (the burst light) disclosed in Japanese Patent Application Publication No. 2016-161411 may be used. It is to be noted that the pulsed light and the intermittent modulated light are generically referred to as the pulsed light.

The first communication module 25 transmits image data acquired by the measuring direction image pickup module 14, image data processed by the image processing module 24, distance measurement data acquired by the distance measuring unit 13 and an angle measurement data acquired by the projecting direction detecting module 28 to the operation panel 5 and receives an operation command from the operation panel 5.

In the first storage module 22, various types of programs are stored. These programs include: an image pickup control program, a distance measurement program, a display program, a communication program, an operation command creating program, a tilt angle calculation program for calculating a tilt angle and a tilting direction of the monopod 3 based on an attitude detection result from the attitude detector 27 and for calculating a vertical component of the tilt angle (a tilt angle of the monopod 3 in a front-and-rear direction with respect to the object to be measured 2) and a horizontal component of the tilt angle (the tilt angle of the monopod 3 in a left-and-right direction with respect to the object to be measured 2), a correction program for correcting a direction of an image acquired based on the calculated tilt, a measurement program for carrying out the distance measurement, a deflection control program for controlling a deflecting operation of the optical axis deflector 26, an image processing program for carrying out the processing such as the synthesis of an image acquired by the lower image pickup module 8 and an image acquired by the measuring direction image pickup module 14, and a calculation program for executing the various types of calculations and other programs. Further, in the first storage module 22, various types of data such as the distance measurement data, the angle measurement data, and the image data are stored.

According to an operating state of the surveying instrument main body 4, the arithmetic control module 21 develops and executes the various types of programs, carries out a control of the distance measuring unit 13, the control of the optical axis deflector 26, a control of the measuring direction image pickup module 14 and the like, and performs the distance measurement by the surveying instrument main body 4. It is to be noted that a CPU specialized for this instrument or a general-purpose CPU is used as the arithmetic control module 21.

Further, as the first storage module 22, various types of storage devices are used. These storage devices include: an HDD as a magnetic storage device, an internal memory, a memory card, a USB memory as a semiconductor storage device and other storage devices are used. The first storage module 22 may be attachable and detachable with respect to the casing 31. Alternatively, the first storage module 22 may enable transmitting the data to an external storage device or an external data processing device via a desired communicating means.

A description will be given on the optical axis deflector 26. It is to be noted that as the optical axis deflector 26, an optical axis deflector disclosed in Japanese Patent Application Publication No. 2016-151422, Japanese Patent Application Publication No. 2017-106813 and Japanese Patent Application Publication No. 2019-15601 can be used.

The optical axis deflector 26 includes a pair of optical prisms 44 and 45. The optical prisms 44 and 45 have disk shape with the same diameter, respectively, are arranged concentrically on the distance measuring optical axis 41 while crossing the distance measuring optical axis 41 at a right angle, and are arranged in parallel at a predetermined interval. By controlling the relative rotation of the optical prisms 44 and 45 and the integral rotation of the optical prisms 44 and 45, the optical axis deflector 26 enables deflecting the distance measuring optical axis 41 at an arbitrary angle ranging from 0° to a maximum deflection angle.

Further, the optical prisms 44 and 45 are continuously driven and continuously deflected while continuously irradiating the distance measuring light 38. Thereby, the distance measuring light 38 can be scanned by a two-dimensional in a predetermined pattern.

The projecting direction detecting module 28 detects a relative rotation angle of the optical prisms 44 and 45, an integral rotation angle of the optical prisms 44 and 45, and detects a deflecting direction (a projecting direction) of the distance measuring optical axis 41 in real time.

A projecting direction detection result (an angle measurement result) is associated with a distance measurement result, input to the arithmetic control module 21, and stored in the first storage module 22. It is to be noted that, in a case where the distance measuring light 38 is burst-emitted, the distance measurement and the angle measurement are performed for each intermittent distance measuring light.

Based on a deflection angle and a projecting direction of the distance measuring light 38, the arithmetic control module 21 calculates a horizontal angle and a vertical angle of a measuring point with respect to the reference optical axis "O". Further, the arithmetic control module 21 associates the horizontal angle and the vertical angle regarding the measuring point with the distance measurement data and can acquire the three-dimensional data of the measuring point. Thus, the surveying instrument main body 4 functions as a total station. When the surveying instrument 1 is used as the total station, the sighting and the distance measurement of the object to be measured 2 can be performed without changing a position of the first image pickup optical axis 15, and hence the workability can be improved.

Next, a description will be given on the attitude detector 27. The attitude detector 27 detects a tilt angle with respect to the horizontal or the vertical of the surveying instrument main body 4, and the detection result is inputted to the arithmetic control module 21. It is to be noted that as the attitude detector 27, an attitude detector disclosed in Japanese Patent Application Publication No. 2016-151423 can be used.

The attitude detector 27 will be described in brief. The attitude detector 27 has a frame 53. The frame 53 is fixed to the casing 31 or fixed to a structural component and is integrated with the surveying instrument main body 4.

A sensor block 54 is mounted on the frame 53 via a gimbal. The sensor block 54 is rotatable by 360° or over 360° in two directions around two axes crossing each other at a right angle, respectively.

A first tilt sensor 55 and a second tilt sensor 56 are mounted on the sensor block 54. The first tilt sensor 55 is a sensor which detects the horizontal with high accuracy, for instance, a tilt detector which makes a detection light enter a horizontal liquid surface, and detects the horizontal according to a change of a reflection angle of a reflected light or an air bubble tube which detects the tilt according to a positional change of sealed air bubbles. Further, the second tilt sensor 56 is a sensor which detects a tilt change with high responsiveness, for instance an acceleration sensor.

Each relative rotation angle of the two axes of the sensor block 54 with respect to the frame 53 are configured to be detected by encoders 57 and 58, respectively.

Further, motors (not shown) which rotate the sensor block 54 in order to maintain the sensor block 54 horizontally are provided in relation with the two axes, respectively. The motors are controlled by the arithmetic control module 21 so that the sensor block 54 is maintained horizontally based on detection results from the first tilt sensor 55 and the second tilt sensor 56.

In a case where the sensor block 54 is tilted with respect to the frame 53 (in a case where the surveying instrument main body 4 is tilted), the relative rotation angle of each axial direction of the frame 53 with respect to the sensor block 54 (horizontal) is detected by the encoders 57 and 58, respectively. Based on the detection results of the encoders 57 and 58, the tilt angles of the surveying instrument main body 4 with respect to the two axes are detected, and the tilting direction of the surveying instrument main body 4 is detected by synthesizing the tilts of the two axes.

The sensor block 54 is rotatable by 360° or over 360° with respect to the two axes and hence, whatever the attitude detector 27 takes any attitude or even if the attitude detector 27 is inverted upside down, for instance, the attitude detector 27 is capable of an attitude detection (the tilt angle and the tilting direction with respect to the horizontal) in all the directions.

In the attitude detection, in a case where high responsiveness is required, the attitude detection and an attitude control are performed based on the detection result of the second tilt sensor 56, but the second tilt sensor 56 has a detection accuracy poorer than the first tilt sensor 55 in general.

The attitude detector 27 includes the first tilt sensor 55 with high accuracy and the second tilt sensor 56 with high responsiveness. Thereby, it is possible to perform the attitude control based on the detection result of the second tilt sensor 56 and further, to perform the attitude detection with high accuracy by the first tilt sensor 55 in real time.

The detection result of the second tilt sensor 56 can be calibrated in real time based on the detection result of the first tilt sensor 55. That is, if a deviation is caused between values of the encoders 57 and 58 of when the first tilt sensor 55 detects the horizontal, that is, an actual tilt angle and the tilt angle detected by the second tilt sensor 56, the tilt angle of the second tilt sensor 56 can be calibrated based on the deviation.

Therefore, if the relationship between a tilt angle detected by the second tilt sensor 56 and a tilt angle, which is obtained based on the horizontal detection by the first tilt sensor 55 and the detection results of the encoders 57 and 58, is obtained in advance, the arithmetic control module 21 can calibrate the tilt angle detected by the second tilt sensor 56, and an accuracy of the attitude detection with high responsiveness by the second tilt sensor 56 can be improved based on this calibration. In a state where there is a small environmental change (temperature or the like), the tilt detection may be performed based on the detection result of the second tilt sensor 56 and a correction value.

The arithmetic control module 21 controls the motors based on the signal from the second tilt sensor 56 when a tilt fluctuation is large and when the tilt change is rapid. Further, the arithmetic control module 21 controls the motors based on the signal from the first tilt sensor 55 when the tilt fluctuation is small and when the tilt change is mild, that is, in a state where the first tilt sensor 55 is capable of following up. It is to be noted that, by calibrating the tilt angle detected by the second tilt sensor 56 at all times, the attitude detection by the attitude detector 27 may be performed based on the detection result from the second tilt sensor 56.

In the first storage module 22, comparison data indicating a comparison result between the detection result of the first tilt sensor 55 and the detection result of the second tilt sensor 56 is stored. The detection result by the second tilt sensor 56 is calibrated based on the signal from the first tilt sensor 55. By this calibration, the detection result by the second tilt sensor 56 can be improved to the detection accuracy of the first tilt sensor 55. Thus, in the attitude detection by the attitude detector 27, high responsiveness can be realized while high accuracy is maintained and the attitude detection with high accuracy can be realized in real time.

The arithmetic control module 21 calculates an inclination angle of the monopod 3 in the front-and-rear direction (inclination angle in an approaching and separating direction with respect to the object to be measured 2) and an inclination angle of the monopod 3 in the left-and-right direction based on the detection result of the attitude detector 27. The inclination angle in the front-and-rear direction appears as a tilt angle of the reference optical axis "O" with respect to the horizontal, and the inclination angle in the left-and-right direction appears as an inclination (rotation) of an image acquired by the measuring direction image pickup module 14.

The arithmetic control module 21 calculates a tilt angle of the distance measuring optical axis 41 with respect to the horizontal based on the inclination angles and the deflection angle by the optical axis deflector 26. Further, based on the inclination of the image, an inclination of an image displayed on the display module 59 (to be described later) is corrected and displayed as a vertical image.

The measuring direction image pickup module 14 is a camera having a field angle 50° to 60°, for instance, substantially equal to a maximum deflection angle "θ/2" (±30°, for instance) of the optical prisms 44 and 45. The relationship among the first image pickup optical axis 15, the distance measuring optical axis 41 and the reference optical axis "O" is already-known, and the distance between each of the optical axes has a known value.

Further, the measuring direction image pickup module 14 can acquire a still image, a continuous image or a video image in real time. The image (an observation image) acquired by the measuring direction image pickup module 14 is transmitted to the operation panel 5. In the present embodiment, the image is displayed on the display module 59 of the operation panel 5 as the observation image which is a still image, and the worker can observe the observation image displayed on the display module 59 and carry out a measurement work. A center of the observation image coincides with the first image pickup optical axis 15, and the reference optical axis "O" is positioned at a position which deviates from the center of the observation image at a predetermined field angle based on a known relationship between the reference optical axis "O" and the first image pickup optical axis 15.

The arithmetic control module 21 controls an image pickup of the measuring direction image pickup module 14. In a case where the measuring direction image pickup module 14 picks up the video image or the continuous image, the arithmetic control module 21 synchronizes a timing of acquiring a frame image constituting the video image or the continuous image with a timing of scanning and of performing the distance measurement by the surveying instrument main body 4 (timing of measuring a distance per a pulsed laser beam). Further, in a case where the measuring direction image pickup module 14 acquires the still image, the arithmetic control module 21 synchronize a timing of acquiring the still image with the timing of scanning by the surveying instrument main body 4. The arithmetic control module 21 also performs associating the image with the measurement data (the distance measurement data, the angle measurement data). Further, the arithmetic control module 21 performs a synchronization control of the image pickup timing between the measuring direction image pickup module 14 and the lower image pickup module 8.

An image pickup element (not shown) of the measuring direction image pickup module 14 is a CCD or a CMOS sensor which is an aggregate of pixels, and each pixel can specify a position on the image pickup element. Each pixel has pixel coordinates in a coordinate system with the first image pickup optical axis 15 as an origin, for instance. The photodetecting signal from each pixel includes an information of the pixel coordinates. Therefore, a position of each pixel on the image pickup element is specified by the pixel coordinates included in the photodetecting signal. Further, since the relationship (distance) between the first image pickup optical axis 15 and the reference optical axis "O" is already-known, a mutual association between the measuring position by the distance measuring unit 13 and the position (pixel) on the image pickup element can be made. An image signal outputted from the image pickup element is inputted into the image processing module 24 via the arithmetic control module 21.

A description will be given on a deflecting action and a scanning action of the optical axis deflector 26.

The optical axis deflector 26 can arbitrarily change the deflecting direction and the deflection angle of the distance measuring light 38 as projected by the combination of the rotational positions of the optical prism 44 and the optical prism 45.

Therefore, if the optical axis deflector 26 is rotated while the laser beam is emitted from the distance measuring unit 13, the distance measuring light 38 can be used for the scanning in an arbitrary two-dimensional pattern.

A description will be given on the lower image pickup module 8.

The lower image pickup module 8 is electrically connected to the surveying instrument main body 4, and image data acquired by the lower image pickup module 8 is inputted into the surveying instrument main body 4.

An image pickup of the lower image pickup module 8 is synchronously controlled with the image pickup of the measuring direction image pickup module 14 and the distance measurement of the distance measuring unit 13 by the arithmetic control module 21. The lower image pickup module 8 is provided at an already-known position with respect to the machine center of the surveying instrument main body 4, and the distance between the lower image pickup module 8 and the lower end of the ferrule 9 is also already-known.

Further, regarding the second image pickup optical axis 16 of the lower image pickup module 8, there is a known relationship in an angle between the second image pickup optical axis 16 and the reference optical axis "O" and in a position of an intersection between the reference optical axis "O" and the second image pickup optical axis 16, and the image data acquired by the lower image pickup module 8 is associated with the image as acquired by the measuring direction image pickup module 14 and the distance measurement data as measured by the distance measuring unit 13 and stored in the first storage module 22 by the arithmetic control module 21.

Figure 3:
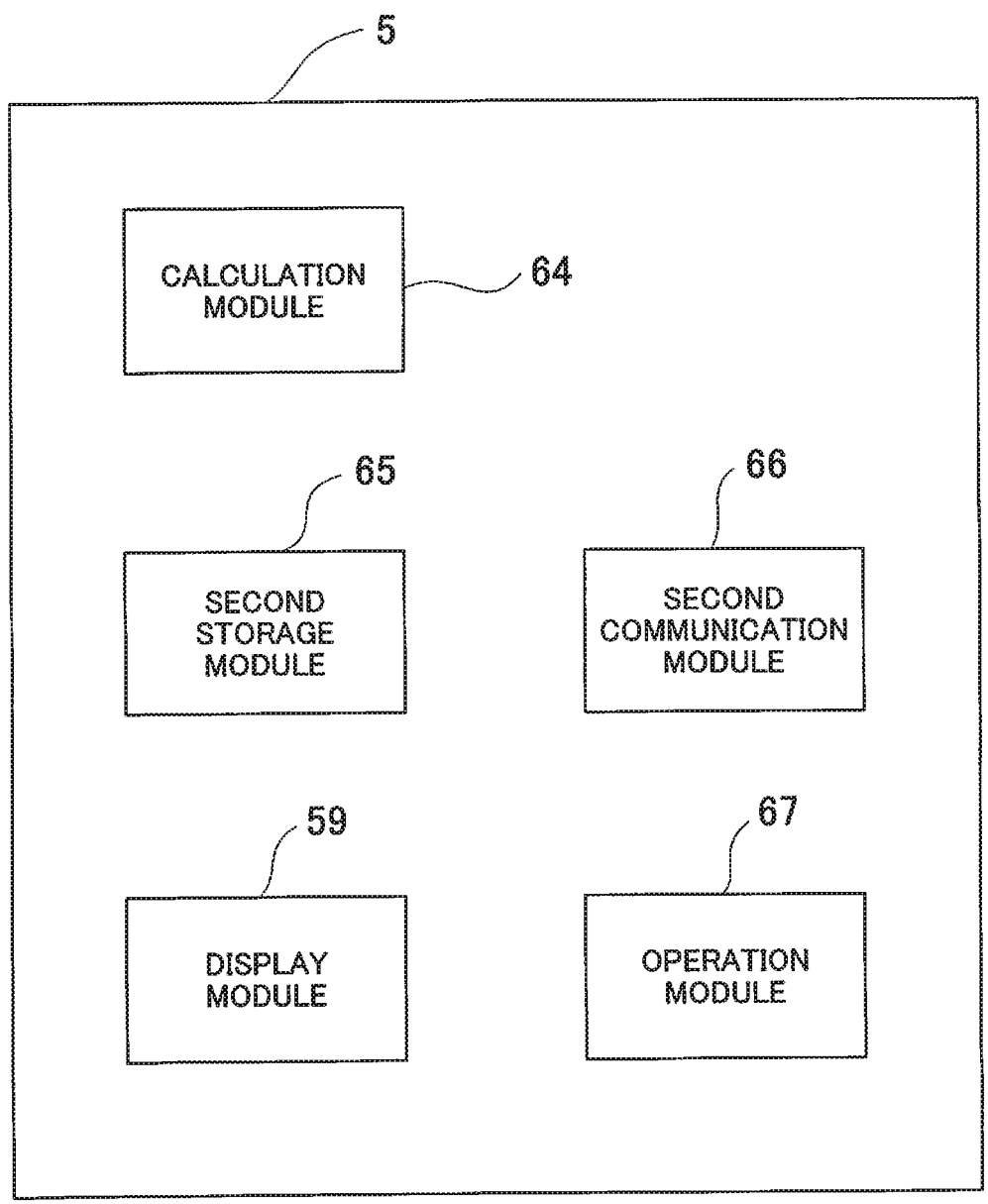
FIG. 3 is a schematical block diagram of an operation panel.

A description will be given on the operation panel 5 in brief by referring to FIG. 3.

The operation panel 5 may be provided in a fixed manner with respect to the monopod 3 as described above or may be attachable and detachable. Further, in a case where the operation panel 5 is attachable and detachable, the operation panel 5 may be removed from the monopod 3, and in a state of the operation panel 5 only, the worker may hold and operate the operation panel 5.

The operation panel 5 mainly includes a calculating module 64, a second storage module 65, the second communication module 66, the display module 59 and an operation module 67. It is to be noted that the display module 59 may be a touch panel, and the display module 59 may also serve as the operation module 67. Further, in a case where the display module 59 is made as the touch panel, the operation module 67 may be omitted. As the calculating module 64, a CPU specialized for this instrument or a general-purpose CPU is used, and the CPU executes programs stored in the second storage module 65 and performs a calculation, a processing and a control. Further, as the second storage module 65, various types of storage devices are used. These storage devices include: an HDD as a magnetic storage device, an internal memory, a memory card and a USB memory as a semiconductor storage device and other devices are used.

In the second storage module 65, various types of programs are stored. These programs include: a communication program for performing a communicating with the surveying instrument main body 4, a display program for displaying the image acquired by the lower image pickup module 8, the image acquired by the measuring direction image pickup module 14, the image processed by the surveying instrument main body 4 and the measurement information measured by the distance measuring unit 13 on the display module 59, a command creating program for creating a command for the surveying instrument main body 4 based on the information operated by the operation module 67 and other programs.

The second communication module 66 communicates data such as the measurement data, the image data, the command and the like, with the image processing module 24 via the arithmetic control module 21 and the first communication module 25.

The display module 59 displays the measurement results such as a measurement state, a distance, and a deflection angle of the surveying instrument main body 4, and displays the images acquired by the lower image pickup module 8 and the measuring direction image pickup module 14 or the images subjected to the image processing by the image processing module 24. Further, the display module 59 can superimpose and display the image acquired by the measuring direction image pickup module 14 and a scan locus. Alternatively, the images may be superimposed by the image processing module 24 and displayed in the display module 59.

As the operation panel 5, a smartphone or a tablet may be used, for instance. Further, the operation panel 5 may be used as a data collector.

Next, a description will be given on a measuring operation of the surveying instrument 1 by referring to FIG. 1, FIG. 2 and FIG. 3. It is to be noted that the following measuring operation is performed by the arithmetic control module 21 which executes the programs stored in the first storage module 22.

As a preparation for starting the measurement, the two auxiliary legs 11 are spread, the lower end of the ferrule 9 is lifted up from an installation surface, and the surveying instrument 1 is supported by the wheels 12. Then, the surveying instrument 1 is pushed or pulled and moved to a substantial position of the reference point "R". Subsequently, the reference optical axis "O" is directed toward the object to be measured 2, and the lower end of the ferrule 9 is positioned to the reference point "R". It is to be noted that a direction of the reference optical axis "O" may be determined from an image acquired by the measuring direction image pickup module 14 (an image displayed in the operation panel 5), or it can be also determined using the reference target 7. Therefore, the reference optical axis "O" may be directed toward the object to be measured 2 based on the reference target 7.

In a state where the monopod 3 tilts at a predetermined angle, the surveying instrument 1 is supported by three points by the lower end of the monopod 3 and the two auxiliary legs 11 (the wheels 12). Therefore, even if a worker has released his/her hand from the monopod 3, the surveying instrument 1 stands by itself. It is to be noted that the operation panel 5 may be mounted on or removed from the monopod 3. Further, in a state where the lower image pickup module 8 and the measuring direction image pickup module 14 are operating, the surveying instrument 1 is installed.

When the surveying instrument 1 has been installed, the observation image acquired by the measuring direction image pickup module 14 is displayed in the display module 59, and a direction and a position of the reference optical axis "O" can be confirmed from the observation image. At this time, a tilt angle and a tilt direction of the monopod 3 are detected by the attitude detector 27.

In a state where the direction of the reference optical axis "O" is determined, a measurable deflection range which has the reference optical axis "O" as a center can be confirmed on the observation image. A worker can designate an arbitrary point in the measurable range in the observation image as a measuring point (the object to be measured 2). By designating the object to be measured 2, the arithmetic control module 21 directs the distance measuring optical axis 41 toward the object to be measured 2 with the use of the optical axis deflector 26.

The distance measuring optical axis 41 is directed toward the object to be measured 2, the distance measuring light 38 is emitted, and the measurement (the distance measurement, the angle measurement) of the object to be measured 2 is performed. A direction of the distance measuring light 38, a distance measurement result, and the like are displayed in the display module 59. Further, in synchronization with the measurement of the object to be measured 2, a first image is acquired by the measuring direction image pickup module 14.

At this time, since the surveying instrument 1 is supported by three points using the monopod 3 and the auxiliary legs 11 (the wheels 12), a sighting state of the distance measuring optical axis 41, that is, a state where the distance measuring optical axis 41 is sighted on the object to be measured 2 is maintained.

It is to be noted that, since a tilt angle and a tilt direction of the surveying instrument 1 with respect to the horizontality are detected by the attitude detector 27 in real time, the measurement result can be corrected based on a detection result. Therefore, a leveling work to horizontally adjust the surveying instrument 1 can be omitted.

In the above description, the measurement is performed with the same action as the action of the total station in a state where the distance measuring optical axis 41 is fixed at the measuring point, but the measurement can be likewise performed by using the surveying instrument 1 as a laser scanner.

Further, when the observation image acquired by the measuring direction image pickup module 14 is synthesized with the lower image acquired by the lower image pickup module 8, the wide-range synthesized image including the reference point "R" to the object to be measured 2 can be acquired, and it facilitates a confirmation of a measurement range and a measuring position and improves the workability. Further, when the observation image or the synthesized image is associated with the data along the locus, which is acquired by a two-dimensional scan, an image with three-dimensional data can be acquired per each pixel.

It is to be noted that calculations such as the calculation of the rotation angle, the calculation of the tilt angle of the distance measuring optical axis 41, the calculation of the horizontal distance may be performed by the arithmetic control module 21, may be performed by the calculating module 64 or may be performed by the processing controller 10.

Further, at the time of moving the surveying instrument 1, the lower end of the ferrule 9 is separated from the installation surface, the wheels 12 are rolled, and the surveying instrument 1 is carried from the reference point "R" to another installation point.

As described above, in the first embodiment, the two auxiliary legs 11 are provided in addition to the monopod 3, and the surveying instrument main body 4 is supported on three points using the monopod 3 and the two auxiliary legs 11. Therefore, since the surveying instrument 1 stands by itself without holding the monopod 3 by the worker, an attitude of the surveying instrument main body 4 during the measurement can be stably maintained, and a measurement accuracy of the surveying instrument 1 can be improved.

Further, in the first embodiment, the wheels 12 are provided at the lower ends of the two auxiliary legs 11, the wheels 12 are rolled, and the surveying instrument 1 is moved. Therefore, even if a high-capacity battery or a sophisticated arithmetic processing system is mounted and a weight of the surveying instrument 1 is increased, the surveying instrument 1 can be moved without imposing a burden on a worker.

Further, the reference plate 6 is provided at the lower end of the monopod 3 and the reference target 7 is provided on the reference plate 6 so that a direction of the reference optical axis "O" can be determined based on the reference target 7. Therefore, the worker can determine the direction of the reference optical axis "O" without seeing an image in the display module 59. Further, an installation work can be performed without changing a direction of a line of sight in the installation work, and the workability at the time of installing the surveying instrument 1 can be improved.

Figure 4:
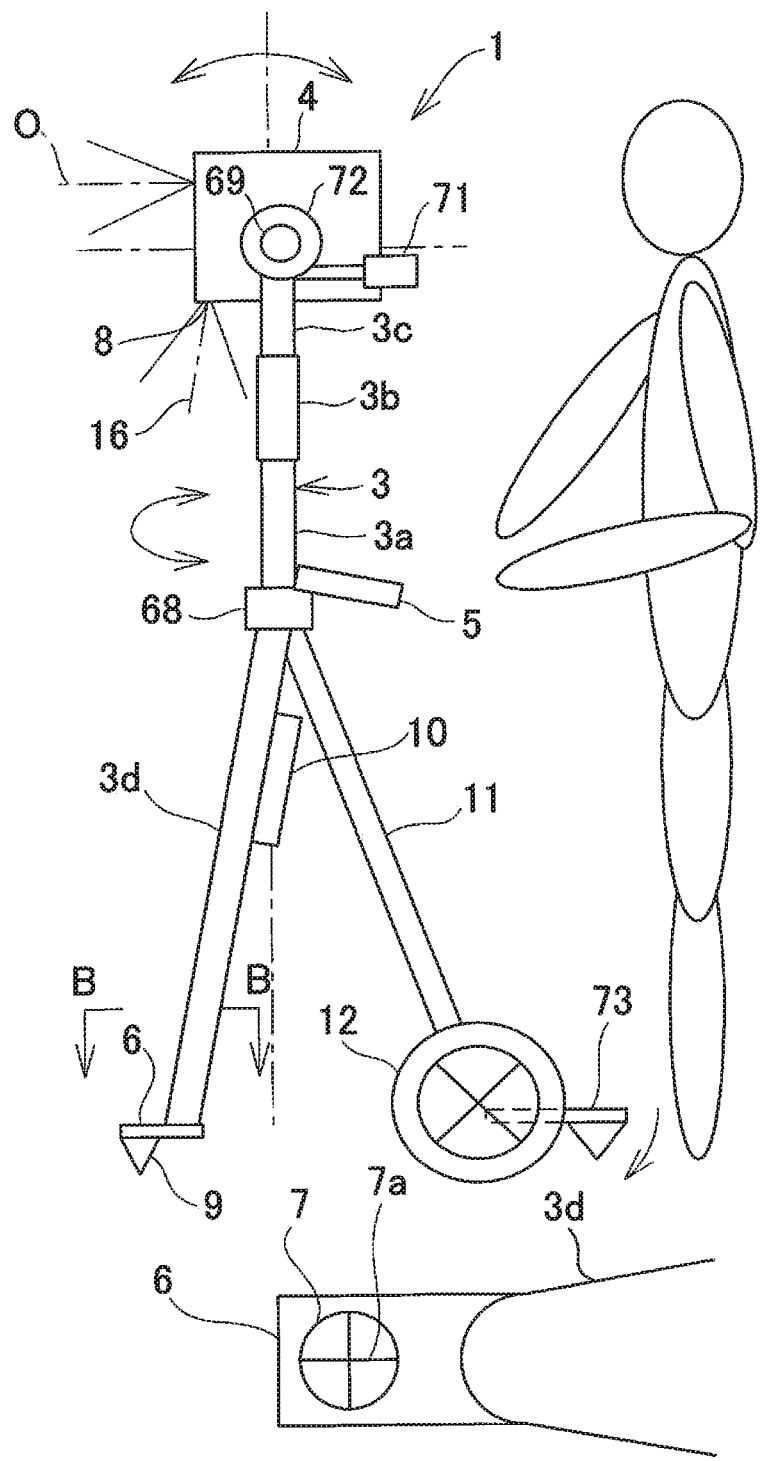
FIG. 4 is a side view showing a surveying instrument according to a second embodiment of the present invention.
Figure 5:
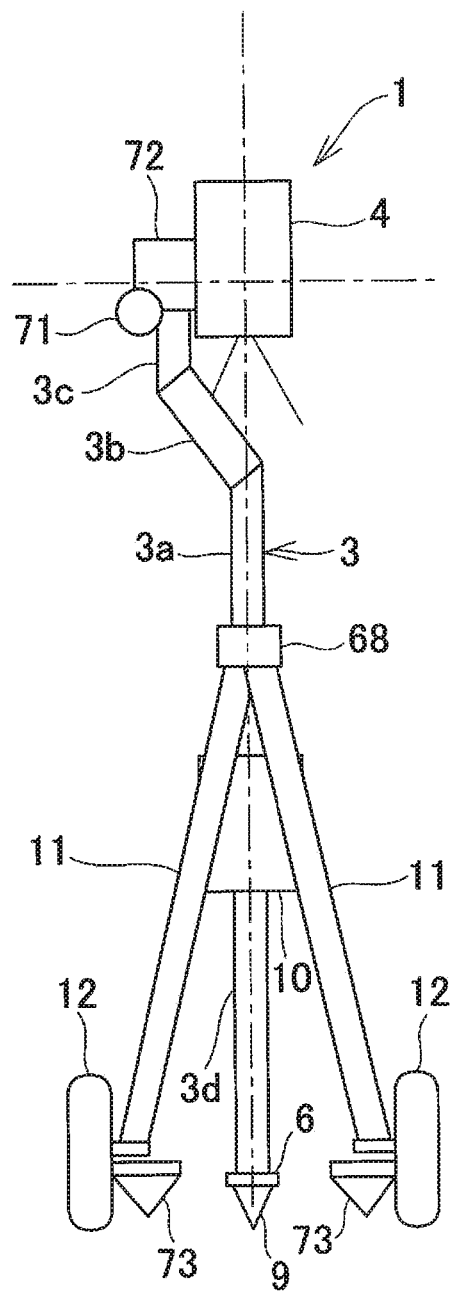
FIG. 5 is a rear view showing the surveying instrument according to the second embodiment of the present invention.

Next, by referring to FIG. 4 and FIG. 5, a description will be given on a second embodiment of the present invention. It is to be noted that, in FIG. 4 and FIG. 5, the same components as shown in FIG. 1 are referred by the same symbols, and a detailed description thereof will be omitted.

In the second embodiment, a lower image pickup module 8 is integrally incorporated in a surveying instrument main body 4. A monopod 3 is constituted of a vertical portion 3a extending in an up-and-down direction, a bending portion 3b which offsets the surveying instrument main body 4 in a horizontal direction in such a manner that a machine center of the surveying instrument main body 4 is placed on an axis extension of the vertical portion 3a, a support portion 3c which extends upward from an upper end of the bending portion 3b, a lateral rotation angle encoder 68 as a lateral rotation detector which is provided at a lower end of the vertical portion 3a and detects a rotation angle in the horizontal direction, and a leg portion 3d which extends downward from a lower end of the lateral rotation angle encoder 68 and tilts toward a sighting direction. A reference plate 6 is provided at a lower end of the leg portion 3d, and a ferrule 9 is provided on a lower surface of the reference plate 6.

It is to be noted that the vertical portion 3a can rotate around an axis of the vertical portion 3a with respect to the leg portion 3d and the auxiliary legs 11, and a relative rotation angle with respect to the leg portion 3d and the auxiliary legs 11 can be detected by the lateral rotation angle encoder 68. Further, a bending direction of the bending portion 3b is a direction in which a field of view of the lower image pickup module 8 is not obstructed.

A shaft portion 69 and a lever 71 extending from the shaft portion 69 are provided on a side surface of the surveying instrument main body 4. Further, a longitudinal rotation angle encoder 72 as a longitudinal rotation detector which detects a rotation angle in a vertical direction is provided on the shaft portion 69. The shaft portion 69 is rotatably coupled with an upper end of the support portion 3c. By moving the lever 71 upward or downward, the surveying instrument main body 4 rotates in the longitudinal direction. Further, by moving the lever 71 in a left-and-right direction, the surveying instrument main body 4 rotates in the lateral direction integrally with support portion 3c, the bending portion 3b, and the vertical portion 3a. Further, by twisting the lever 71, the lever 71 locks a movement of the lateral rotation and the longitudinal rotation.

A rotation angle of the surveying instrument main body 4 in the longitudinal direction, for instance, a rotation angle (an angle of elevation) in the vertical direction with respect to the horizontality is detected by the longitudinal rotation angle encoder 72. Further, the rotation of the surveying instrument main body 4 in the lateral direction, for instance, a rotation angle (a horizontal angle) in the horizontal direction with respect to the reference optical axis "O" in a case where a direction along which a reference line 7a of the reference target 7 becomes parallel to the reference optical axis "O" is a reference direction is detected by the lateral rotation angle encoder 68. The rotation angle detected by the lateral rotation angle encoder 68 and the rotation angle detected by the longitudinal rotation angle encoder 72 are input to an arithmetic control module 21 of the surveying instrument main body 4, respectively.

It is to be noted that the machine center of the surveying instrument main body 4 is placed on the axis of the vertical portion 3a, and the reference optical axis "O" crosses the axis of the vertical portion 3a. Further, when the surveying instrument main body 4 is longitudinal rotated 90°, the reference optical axis "O" and the axis of the vertical portion 3a coincide or become parallel with each other.

Further, a protrusion 73 as a fixing means is provided to each wheel 12 in a protrudable and retractable manner, the protrusion 73 is retracted in a moving state of the surveying instrument 1, and the protrusion 73 is protruded in an installing state of the surveying instrument 1. A protruding state of the protrusion 73 is fixed in a state where each wheel 12 is slightly lifted up from an installation surface. At this time, the surveying instrument main body 4 is supported by three points in a state where the ferrule 9 and the two protrusions 73 are in contact with the installation surface.

In the second embodiment, the members which contact with the installation surface are the three fixed points which are the ferrule 9 and the protrusions 73. Therefore, the surveying instrument main body 4 can be supported at the stability which is to equal to a tripod, and the support stability of the surveying instrument main body 4 can be improved. Therefore, for instance, even if the installation surface tilts, the wheels 12 do not roll on the installation surface, and the surveying instrument 1 can stand by itself.

Further, since the surveying instrument main body 4 can rotate in the lateral direction and the longitudinal direction, the reference optical axis "O" can be directed from a predetermined measuring point to another measuring point without moving the surveying instrument 1 from an installing position. Further, since the rotation angles in the lateral direction and the longitudinal direction are detected by the lateral rotation angle encoder 68 and the longitudinal rotation angle encoder 72 respectively, the measurements results when a measuring direction has changed can be easily associated.

Further, the arithmetic control module 21 can convert the rotation angle in the lateral direction detected by the lateral rotation angle encoder 68 and the rotation angle in the longitudinal direction detected by the longitudinal rotation angle encoder 72 into a horizontal angle and a vertical angle based on a detection result of an attitude detector 27.

It is to be noted that, in the second embodiment, the protrusions 73 are provided to the respective wheels 12 as the fixing means, and the rotation of the wheels 12 on the installation surface is prevented by the protrusions 73. However, if the wheels 12 can be prevented rolling on the installation surface, any other configuration can be adopted. For instance, the lock mechanisms which constrain the rotation of the wheels 12 may be provided to the wheels 12 as the fixing means respectively the lock mechanisms can prevent the rolling of the wheels 12 on the installation surface.

Figure 6:
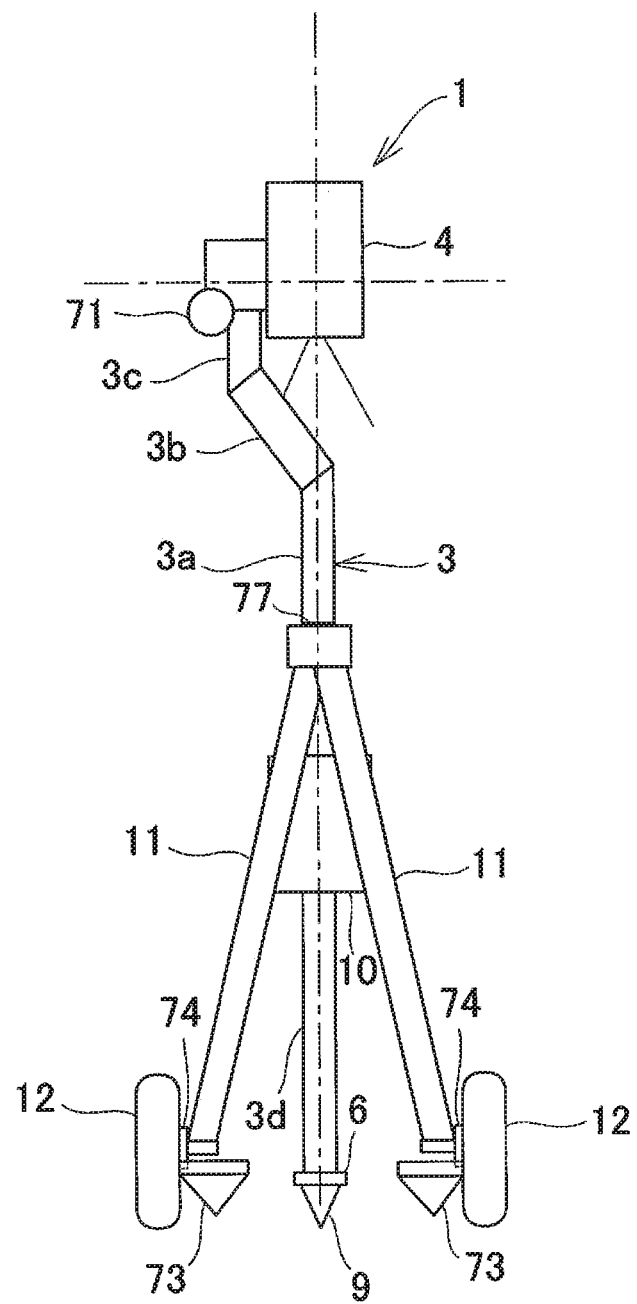
FIG. 6 is a rear view showing a surveying instrument according to a third embodiment of the present invention.
Figure 7A:
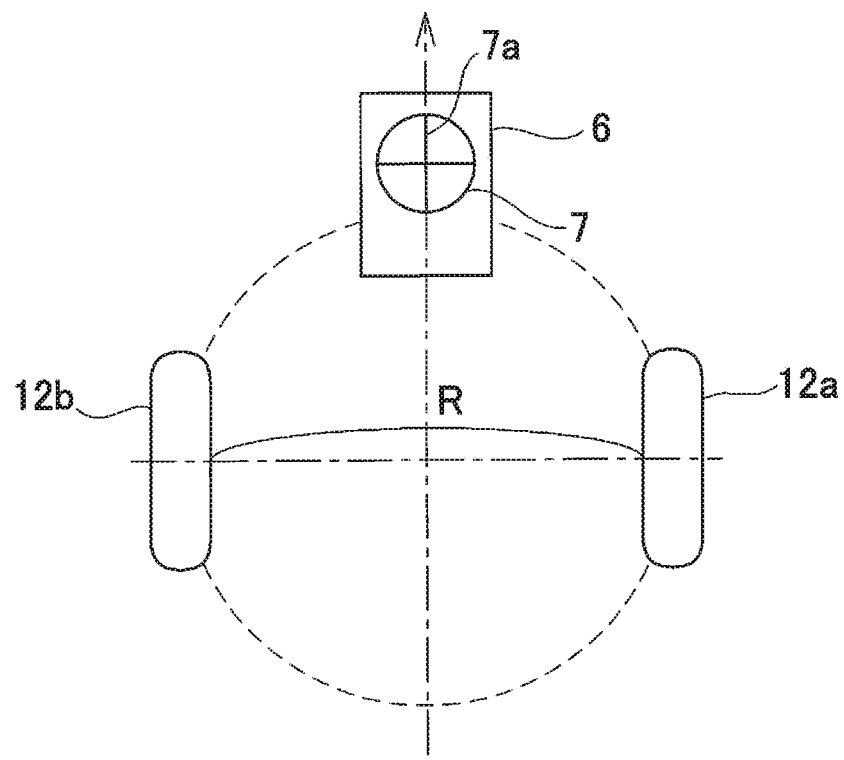
FIG. 7A is an explanatory drawing showing a relationship between the wheels and a reference plate.
Figure 7B:
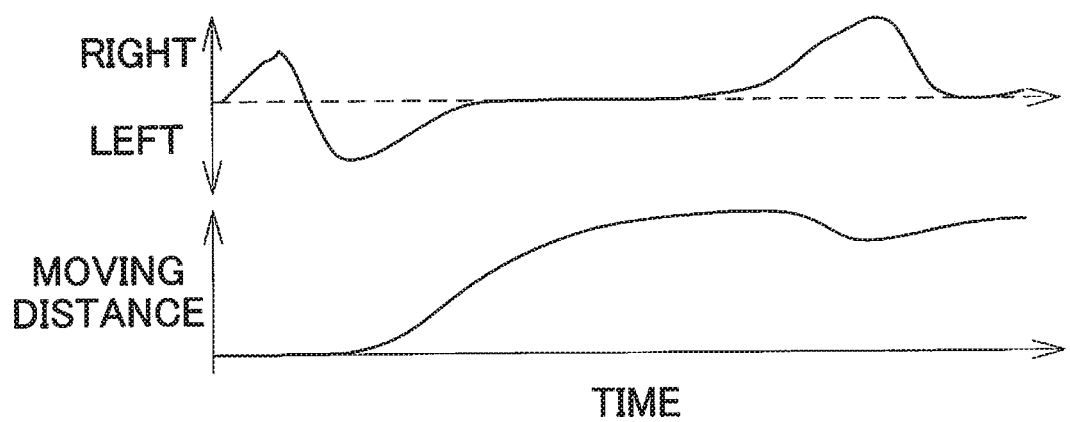
FIG. 7B is a graph showing a relationship between the number of rotations of the wheels, a moving distance, and a time.
Figure 8:
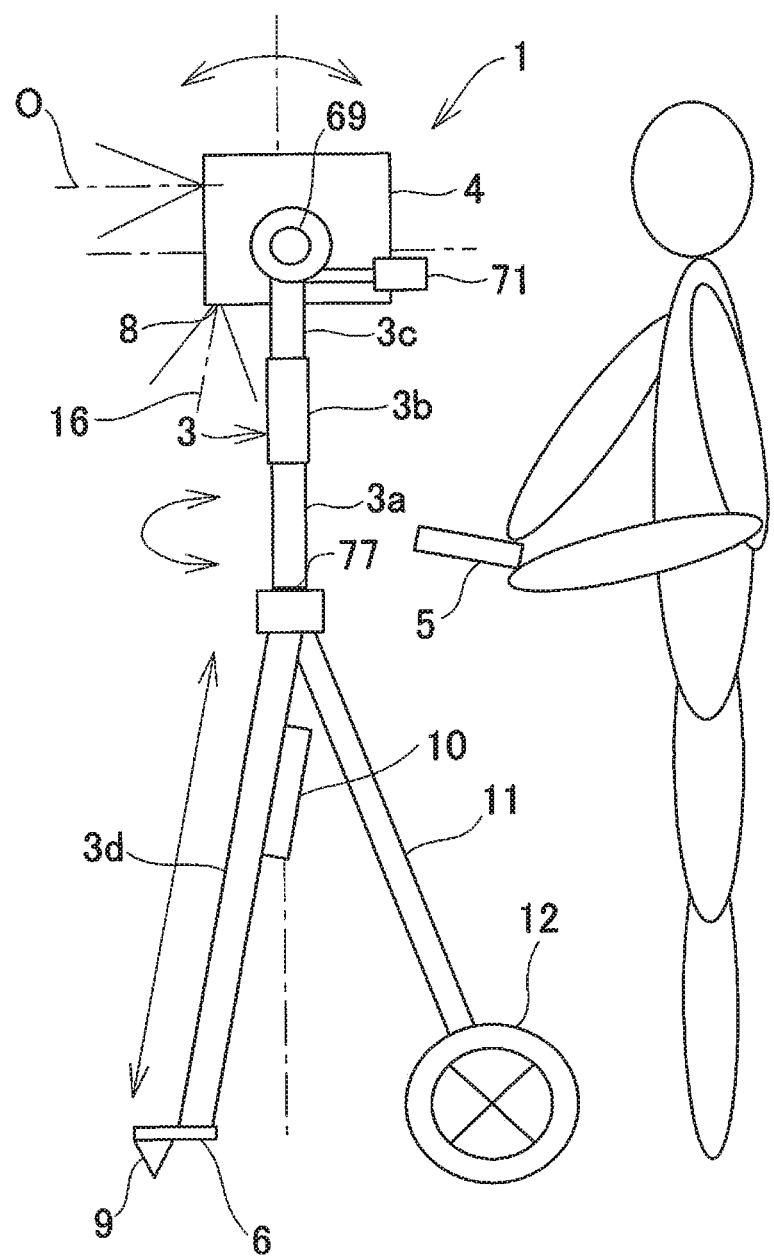
FIG. 8 is a side view showing a surveying instrument according to a fourth embodiment of the present invention.

Next, by referring to FIG. 6, FIG. 7A and FIG. 7B, a description will be given on a third embodiment of the present invention. It is to be noted that, in FIG. 6, the same components as shown in FIG. 5 are referred by the same symbols, and a detailed description thereof will be omitted.

In a surveying instrument 1 according to a third embodiment, a diameter "D" of each of two wheels 12 is known, and a distance between the wheels 12 is "R". A rotation meter 74 is provided to each of the wheels 12. Further, a time measuring means (not shown) such as a timer is also provided to a processing controller 10 or an arithmetic control module 21. The other structures are equal to the surveying instrument 1 of the second embodiment.

The rotation meter 74 can detect the number of rotations of each wheel 12, and a detection result is input to the processing controller 10 or the arithmetic control module 21.

Further, the time measuring means operates in synchronization with the rotations of the wheels 12 and measures a time from the start to the end of the rotations of the wheels 12.

Here, assuming that a moving distance of one wheel 12a is "A", a moving distance of the other wheel 12b is "B", and an average moving distance of the surveying instrument 1 is "L". In this case, the moving distance "A", the moving distance "B", and the average moving distance "L" can be represented by the following expressions, respectively. It is to be noted that, in FIG. 7B, an upper graph is a graph showing a relationship between a difference in number of rotations of the one wheel 12a and the other wheel 12b and a time, and a lower graph is a graph showing a relationship between a moving distance (the average moving distance "L") of the surveying instrument 1 and a time.

$A$ = a circumference length (a diameter $D \times \pi$) of the wheel $12a \times$ the number of rotations of the wheel $12a$ $B$ = a circumference length (the diameter $D \times \pi$) of the wheel $12b \times$ the number of rotations of the wheel $12b$ $L = (A+B)/2$ In the above expressions, the signs of the moving distance "A" and the moving distance "B" become + in a case where the wheels 12a and 12b move forward, and the signs of the moving distance "A" and the moving distance "B" become − in a case where the wheels 12a and 12b move backward.

Further, the arithmetic control module 21 can calculate a rotation angle in a reference direction after the movement with respect to the reference direction (a direction which is orthogonal to the axles and in which the reference target 7 is provided) before the movement based on the moving distance "A", the moving distance "B", and a wheel interval "R" (see FIG. 7A) between the one wheel 12a and the other wheel 12b. That is, the arithmetic control module 21 can calculate a change in direction of the reference target 7. It is to be noted that, if the rotation angle at this time is "α", "α" can be represented by the following expression.

$\alpha = (A-B) \times 360°/2\pi R$

In the third embodiment, based on the detection results of the rotation meters 74 provided to each of the wheels 12, the diameters of the wheels 12 and the wheel interval of the wheels 12, a moving distance and a change in direction of the surveying instrument 1 at an installation point after the movement with respect to an installation point before the movement can be calculated. Therefore, a distance between each of the installation points and a change in direction of the surveying instrument 1 can be estimated based on the calculation results, and a direction of an object to be measured 2 after the movement can be estimated.

Further, in the third embodiment, the time measuring means measures a time in synchronization with the rotations of the wheels 12, and the arithmetic control module 21 associates a moving distance of the surveying instrument 1 with a change in direction. Therefore, it is possible to perceive the moving distance and the change in direction of the surveying instrument 1 as a change with respect to a elapsed time. Therefore, a moving locus of the surveying instrument 1 can be calculated by the arithmetic control module 21, and an accurate linear distance between the installation point before the movement and the installation point after the movement and a direction of the surveying instrument 1 can be calculated by arithmetic control module 21 based on the moving locus.

Next, by referring to FIG. 8, FIG. 9A, FIG. 9B, FIG. 9C and FIG. 9D, a description will be given as to a fourth embodiment of the present invention. It is to be noted that, in FIG. 8, the same components as shown in FIG. 4 are referred by the same symbols, and a detailed description thereof will be omitted.

In the fourth embodiment, a leg portion 3d of a monopod 3 is expansible and contractible, and an angle of a reference optical axis "O" in an up-and-down direction can be changed by the expansion and the contraction of the leg portion 3d. Further, in the fourth embodiment, a lateral rotation angle encoder 68 and a longitudinal rotation angle encoder 72 in the second embodiment and the third embodiment are not provided.

A change in angle of the reference optical axis "O" in the up-and-down direction can be detected based on an image acquired by a lower image pickup module 8. Further, the states of a horizontal rotation around a ferrule 9 and a rotation around a vertical portion 3a of a surveying instrument 1 can be likewise detected based on an image acquired by the lower image pickup module 8.

FIG. 9A, FIG. 9B, FIG. 9C and FIG. 9D show the lower images 75 acquired by the lower image pickup module 8. In each lower image 75, at least one reference object 76 (FIG. 9A, FIG. 9B, FIG. 9C and FIG. 9D show the reference objects 76a and 76b) is present on the land surface, and a reference plate 6, a reference target 7, and a part of the leg portion 3d are present. Further, a predetermined position on the vertical portion 3a of the monopod 3 in each lower image 75 is set as a leg length reference position, and a leg length reference line 77 is set at the leg length reference position. It is to be noted that the reference object 76 may be installed as a reference, or extracted from the lower image 75, and it may be, for instance, a small pebble. Further, the leg length reference line 77 may be a marking or a recognizable change in shape.

It is to be noted that, in FIG. 9A, FIG. 9B, FIG. 9C and FIG. 9D, a solid line indicates the reference plate 6, the reference target 7, the leg portion 3d, and the reference objects 76a and 76b before the movement, and a broken line indicates the reference plate 6', the reference target 7', the leg portion 3d', and the reference objects 76a' and 76b' after the movement.

Figure 9A:
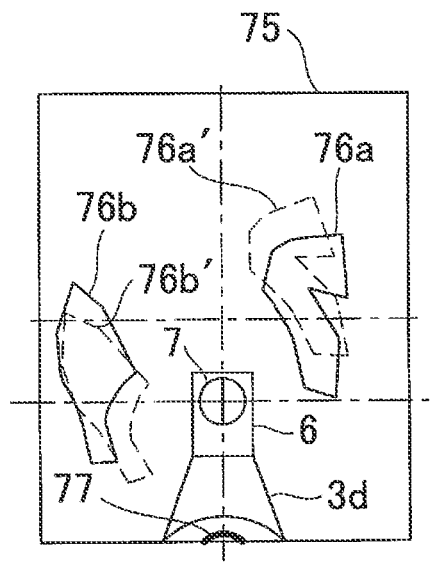
FIG. 9A, FIG. 9B, FIG. 9C and FIG. 9D are the explanatory drawings showing the changes in a lower image when a monopod has expanded or contracted or a surveying instrument main body has rotated.

In a case where the surveying instrument 1 has rotated around the ferrule 9 in the horizontal direction (in FIG. 9A, the surveying instrument 1 rotates in the clockwise direction), a positional relationship between the lower image pickup module 8 and the ferrule 9 does not change. Therefore, as shown in FIG. 9A, a position of the reference target 7 in the lower image 75 does not change. On the other hand, the positions of the reference objects 76a and 76b in the lower image 75 are displaced in a direction opposite to a rotating direction of the surveying instrument 1 on a circumference having an intersection of the reference target 7 as a center, that is, to the positions of the reference objects 76a' and 76b'. In this case, based on the displacement amounts between the reference objects 76a and 76b and the reference objects 76a' and 76b', a horizontal rotation angle of the surveying instrument 1 around the ferrule 9 can be obtained by the arithmetic control module 21.

Figure 9B:
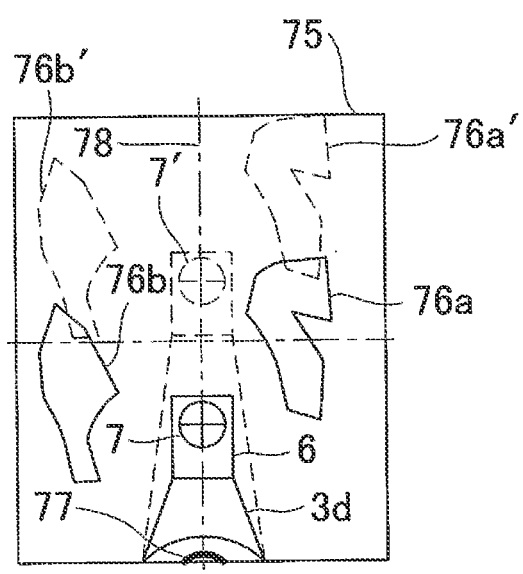

Further, in a case where the leg portion 3d has expanded or contracted, as shown in FIG. 9B, the arithmetic control module 21 can recognize a leg length and can calculate the leg length based on a displacement amount of the reference target 7 with respect to the leg length reference line 77.

Figure 9C:
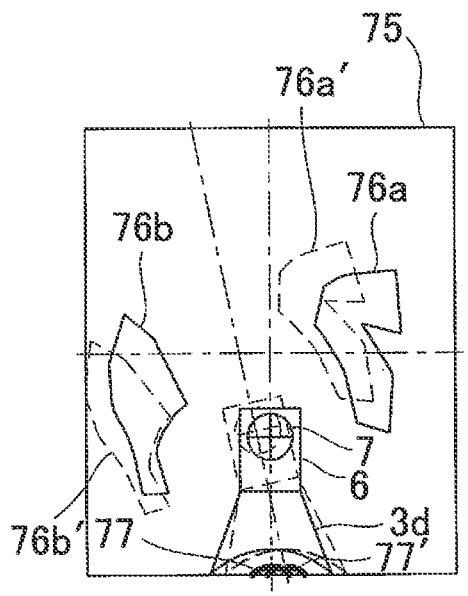

Further, in a case where the surveying instrument main body 4 has rotated around an axis of the vertical portion 3a in the horizontal direction (in FIG. 9C, the surveying instrument 1 rotates in a clockwise direction), a positional relationship between the lower image pickup module 8 and the ferrule 9 also changes. Therefore, as shown in FIG. 9C, the positions of the reference target 7 and the reference objects 76a and 76b in the lower image 75 are displaced in the direction opposite to the rotating direction of the surveying instrument main body 4 on a circumference having the machine center of the surveying instrument main body 4 as a center (the axis of the vertical portion 3a). In this case, based on the displacement amounts between the reference objects 76a and 76b and the reference objects 76a' and 76b' and a displacement amount between the reference target 7 and the reference target 7', the arithmetic control module 21 can calculate a horizontal rotation angle of the surveying instrument main body 4 around the axis of the vertical portion 3a.

Figure 9D:
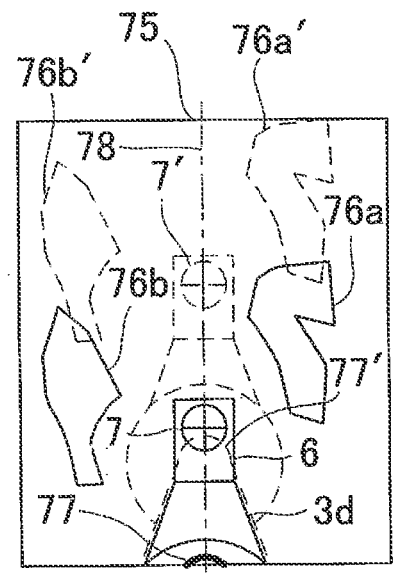

Further, in a case where the surveying instrument main body 4 has rotated in the up-and-down direction via a shaft portion 69, as shown in FIG. 9D, the leg length reference line 77 also moves to the leg length reference line 77'. Therefore, based on a moving amount of the leg length reference line 77 with respect to a field angle, the arithmetic control module 21 can calculate a rotation angle of the surveying instrument main body 4 in the up-and-down direction.

Based on the displacements of the positions of the reference target 7 and the reference objects 76a and 76b in the lower image 75 before the movement and after the movement, an arithmetic control module 21 (see FIG. 2) determines whether the rotation is a rotation of around the ferrule 9, a rotation of the surveying instrument main body 4 around the axis of the vertical portion 3a, or a combination of these rotations.

Further, based on a displacement of a distance between the leg length reference line 77 and a lower end of the reference plate 6 in the lower image 75, the arithmetic control module 21 calculates an expansion/contraction amount of the leg portion 3d. Further, based on a moving amount of the leg length reference line 77, the arithmetic control module 21 calculates a rotation angle of the surveying instrument main body 4 (the reference optical axis "O") in the longitudinal direction. Further, based on the expansion/contraction amount of the leg portion 3d, the arithmetic control module 21 calculates a distance between an installation point and the machine center and calculates the displacements of the machine center in the up-and-down direction and the horizontal direction.

Further, based on the displacements of the reference objects 76a and 76b in the lower image 75, the arithmetic control module 21 calculates a rotation angle of the surveying instrument main body 4 (the reference optical axis "O") around the ferrule 9 or around the machine center of the surveying instrument main body 4 in a lateral direction (the horizontal direction).

Based on a detection result of the attitude detector 27, the arithmetic control module 21 corrects the calculated rotation angles of the surveying instrument main body 4 in the longitudinal direction and the lateral direction and calculates a horizontal angle and a vertical angle of the reference optical axis "O".

In the fourth embodiment, the arithmetic control module 21 compares the lower image 75 of the surveying instrument 1 before moving with the lower image 75 of the surveying instrument 1 after moving, the lower image 75 of the leg portion 3d before expanding or contracting with the lower image 75 of the leg portion 3d after expanding or contracting, or the lower image 75 of the surveying instrument main body 4 in the lateral direction and the longitudinal direction before rotating with the lower image 75 of the surveying instrument main body 4 in the lateral direction and the longitudinal direction after rotating, and calculates a length of the leg portion 3d, the rotation angle in the lateral direction of the surveying instrument main body 4 and the rotation angle in the longitudinal direction of the surveying instrument main body 4.

Therefore, since the rotation angles in the lateral direction and the longitudinal direction can be calculated without providing the encoders configured to detect the rotation angles, an encoder which detects a lateral rotation and an encoder which detects a longitudinal rotation do not have to be provided to the surveying instrument 1, and the simplification of an instrument configuration and a reduction in manufacturing cost can be achieved.

It is to be noted that, in the fourth embodiment, the expansion or contraction of the leg portion 3d is calculated based on a distance between the leg length reference line 77 and the lower end of the reference plate 6 or a displacement of a position of the reference target 7. However, a staff may be formed on the leg portion 3d, and the expansion or contraction of the leg portion 3d may be calculated by reading the staff at a reference position set in the lower image 75.

Further, in the fourth embodiment, the expansion or contraction of the leg portion 3d and the rotation of the surveying instrument main body 4 are calculated based on a displacement of the lower image 75 before and after the movement. However, any other state may be detected based on the lower image 75. For instance, a position of the reference target 7 in the lower image 75 may be always monitored, and the stability of the surveying instrument main body 4 during the measurement may be confirmed.

Further, needless to say, the first embodiment to the fourth embodiments may be appropriately combined.

The invention claimed is:

1. A surveying instrument comprising a monopod which is installed on a reference point, a surveying instrument main body which is provided at a known distance from a lower end of said monopod and a known angle with respect to an axis of said monopod and has a reference optical axis, two auxiliary legs which extend downward from a middle portion of said monopod at a predetermined angle, and a lower image pickup module which is provided at a known position with respect to said surveying instrument main body, wherein said surveying instrument main body comprises a measuring unit configured to measure a distance to an object to be measured, a measuring direction image pickup module configured to acquire an observation image including said object to be measured in a predetermined relationship with said reference optical axis, and an arithmetic control module configured to make said measuring unit for measuring a predetermined measuring point, make said measuring direction image pickup module for acquiring an image of said object to be measured, and make said lower image pickup module for acquiring a lower image, wherein said surveying instrument main body is supported by three points by said monopod and said auxiliary legs, and a positional change or a rotational change of said surveying instrument main body is calculating based on a change of said lower image, wherein said monopod comprises a reference plate provided at said lower end of said monopod, a reference target provided on an upper surface of said reference plate, and a ferrule provided on a lower surface of said reference plate in such a manner that a center of said reference target coincides with an axis, wherein said lower image is acquired in such a manner that said reference target and at least one reference object are included, and said arithmetic control module calculates a rotation angle of a longitudinal direction and a rotation angle of a lateral direction of said surveying instrument main body based on a displacement of a position of at least one of said reference target and said reference object in said lower image.

2. The surveying instrument according to claim 1, wherein said monopod is configured expandable or contractible.

3. The surveying instrument according to claim 2, wherein a leg length reference line is set in said lower image, and said arithmetic control module calculates an expansion or contraction amount of said monopod based on a distance between said leg length reference line and a lower end of said reference plate in said lower image.

4. The surveying instrument according to claim 3, wherein said surveying instrument main body further comprises an attitude detector configured to detect the tilts of two axes with respect to the horizontality, and said arithmetic control module converts a rotation angle of a longitudinal direction and a rotation angle of a lateral direction of said surveying instrument main body into a vertical angle and a horizontal angle based on a detection result of said attitude detector.

5. The surveying instrument according to claim 2, wherein said surveying instrument main body further comprises an attitude detector configured to detect the tilts of two axes with respect to the horizontality, and said arithmetic control module converts a rotation angle of a longitudinal direction and a rotation angle of a lateral direction of said surveying instrument main body into a vertical angle and a horizontal angle based on a detection result of said attitude detector.

6. The surveying instrument according to claim 1, wherein said surveying instrument main body further comprises an attitude detector configured to detect the tilts of two axes with respect to the horizontality, and said arithmetic control module converts a rotation angle of a longitudinal direction and a rotation angle of a lateral direction of said surveying instrument main body into a vertical angle and a horizontal angle based on a detection result of said attitude detector.

* * * * *